US012681411B2

(12) United States Patent
Saito

(10) Patent No.: US 12,681,411 B2
(45) Date of Patent: Jul. 14, 2026

(54) FIXATION DEVICE AND IMAGE FORMATION APPARATUS

(71) Applicant: Oki Electric Industry Co., Ltd., Tokyo (JP)

(72) Inventor: Hisatoshi Saito, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 19/018,541

(22) Filed: Jan. 13, 2025

(65) Prior Publication Data

US 2025/0328095 A1 Oct. 23, 2025

(30) Foreign Application Priority Data

Apr. 18, 2024 (JP) ................................ 2024-067556

(51) Int. Cl.
*G03G 15/20* (2006.01)
*G03G 21/16* (2006.01)

(52) U.S. Cl.
CPC ..... *G03G 15/2025* (2013.01); *G03G 15/2064* (2013.01); *G03G 21/1685* (2013.01); *G03G 2215/2025* (2013.01); *G03G 2221/1618* (2013.01); *G03G 2221/1639* (2013.01)

(58) Field of Classification Search
CPC .......... G03G 15/2025; G03G 15/2053; G03G 15/2064; G03G 21/1685; G03G 2215/2025; G03G 2221/1618; G03G 2221/1639
See application file for complete search history.

(56) References Cited

U.S. PATENT DOCUMENTS 10,935,911 B2 * 3/2021 Kawata .............. G03G 15/2053

FOREIGN PATENT DOCUMENTS

JP 2020-56822 A 4/2020

* cited by examiner

*Primary Examiner* — Sophia S Chen
(74) *Attorney, Agent, or Firm* — METROLEX IP LAW GROUP, PLLC; Robert L. Scott, Esq.

(57) ABSTRACT

A fixation device according to an embodiment may include: an annular belt; flange members facing both ends of the annular belt, respectively, each including: a flange portion that regulates an end portion of the annular belt; and a support surface that supports an inner circumferential surface of the annular belt; a cleaning roller in contact with an outer circumferential surface of the annular belt; and an opposing member provided between the flange members and facing the cleaning roller with the annular belt therebetween in a region where the annular belt and the cleaning roller are in contact with each other. In a view along an axial direction of the cleaning roller, a first distance from an axial center of the cleaning roller to the opposing member is equal to or greater than a second distance from the axial center of the cleaning roller to the support surface.

8 Claims, 11 Drawing Sheets

FIXATION DEVICE AND IMAGE FORMATION APPARATUS

CROSS REFERENCE TO RELATED APPLICATIONS

This application claims priority based on 35 USC 119 from prior Japanese Patent Application No. 2024-067556 filed on Apr. 18, 2024, entitled "FIXATION DEVICE AND IMAGE FORMATION APPARATUS", the entire contents of which are incorporated herein by reference.

BACKGROUND

The disclosure may relate to a fixation device for an image formation apparatus, and to a configuration of a fixation device including an annular belt.

In a related art, there has been known a fixation device in which end portions of an annular belt are rotatably supported by flange members (see, for example, Patent Document 1).

Patent Document 1: Japanese Patent Application Publication No. 2020-056822 (see Page 7, FIGS. 4 and 5)

SUMMARY

However, in a case where a cleaning roller for cleaning the annular belt is further provided to prevent the annular belt from becoming dirty, a problem may arise in that durability of the annular belt decreases. An object of an embodiment of the disclosure may be to provide a fixation device that can suppress a decrease in durability of an annular belt even in a case in which a cleaning roller for cleaning the annular belt is provided.

An aspect of one or more embodiments of the disclosure may be a fixation device that may include: an annular belt; a pair of flange members facing both ends of the annular belt, respectively, each of the pair of flange members including: a flange portion that regulates an end portion of the annular belt; and a support surface that supports an inner circumferential surface of the annular belt; a cleaning roller in contact with an outer circumferential surface of the annular belt; and an opposing member provided between the pair of flange members and facing the cleaning roller with the annular belt therebetween in a region where the annular belt and the cleaning roller are in contact with each other. In a view along an axial direction of the cleaning roller, a first distance from an axial center of the cleaning roller to the opposing member is equal to or greater than a second distance from the axial center of the cleaning roller to the support surface.

According to the aspect described above, it is possible to provide the fixation device capable of suppressing a decrease in durability of the annular belt even in the case in which the cleaning roller for cleaning the annular belt is provided.

BRIEF DESCRIPTION OF DRAWINGS

FIGS. 5A and 5B are diagrams illustrating a configuration of a right guide member 111R, in which FIG. 5A is a rear view of the right guide member 111R and FIG. 5B is an external perspective view of the right guide member 111R as seen from diagonally above;

FIGS. 9A and 9B are diagrams for explaining a positional relationship between the opposing member, the right guide member, and a cleaning roller, in which FIG. 9A is a schematic view of a part of the fixation belt unit as viewed from the left side in the longitudinal direction of the fixation belt unit, and FIG. 9B is a perspective view of a part of the fixation belt unit as viewed from diagonally above;

FIGS. 10A and 10B are diagrams for explaining a configuration of a right guide member to be employed in a fixation device according to a second embodiment, in which FIG. 10A illustrates an external perspective view of the right guide member and FIG. 10B illustrates a schematic view of the right guide member as viewed from a positive side of the arrow Y direction, with the right guide member, a heater unit, a cleaning roller, and an opposing member arranged in the predetermined positions.

DETAILED DESCRIPTION

Figure 1:
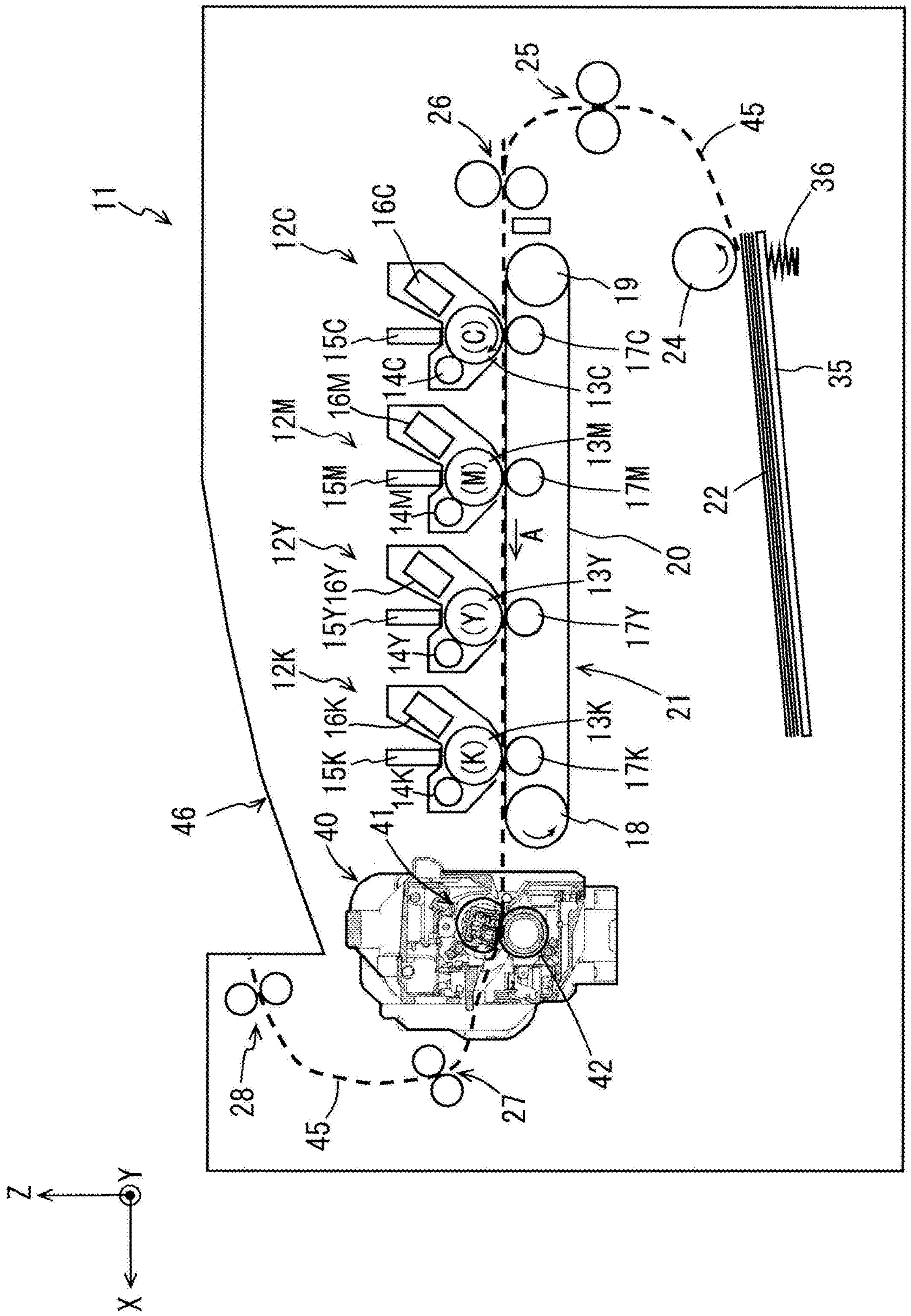
FIG. 1 is a diagram illustrating a view of a part of a configuration of an image formation apparatus according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

FIG. 1 is a diagram illustrating a view of a part of a configuration of an image formation apparatus 11 according to a first embodiment.

The image formation apparatus 11 is configured as, for example, an electrophotographic direct transfer type color printer. The image formation apparatus 11 includes four independent image formation units 12C, 12M, 12Y, and 12K (which may be simply referred to as an image formation unit(s) 12 when there is no particular need to distinguish between them) that are detachably attached and are arranged in order from an upstream side in a conveyance direction (the direction of the arrow A) of recording paper 22 (or a medium, a recording medium). The image formation unit 12C is configured to form a cyan (C) image, the image formation unit 12M is configured to form a magenta (M) image, the image formation unit 12Y is configured to form a yellow (Y) image, and the image formation unit 12K is configured to form a black (K) image.

In an embodiment, the image formation units 12C, 12M, 12Y, and 12K have the same configuration as each other except for the color of toner they contain. Therefore, an internal structure of the cyan (C) image formation unit 12C is described below as a representative example of the image formation units and redundant descriptions may be omitted.

The image formation unit 12C includes a photosensitive drum 13C, a charging roller 14C that uniformly charges the surface of the photosensitive drum 13C, and a development device 16C that forms a toner image by adhering the toner of cyan to the electrostatic latent image formed on the surface of the photosensitive drum 13C. Note that, photosensitive drums 13C, 13M, 13Y, and 13K may simply be referred to as a photosensitive drum(s) 13 when there is no particular need to distinguish between them, charging rollers 14C, 14M, 14Y, and 14K may simply be referred to as a charging roller(s) 14 when there is no particular need to distinguish between them, development devices 16C, 16M, 16Y, and 16K may simply be referred to as a development device(s) 16 when there is no particular need to distinguish between them.

An exposure head 15C is provided above the photosensitive drum 13C in a position facing the photosensitive drum 13C. Note that exposure heads 15C, 15M, 15Y, and 15K may be simply referred to as an exposure head(s) 15 when there is no particular need to distinguish between them. In the same manner, the other exposure heads 15M, 15Y, and 15K are provided above the corresponding photosensitive drums 13M, 13Y, and 13K, respectively. The exposure head 15 selectively exposes the surface of the corresponding photosensitive drum 13 with light in accordance with image data of the corresponding color, so as to form the electrostatic latent image on the surface of the photosensitive drum 13.

Below the photosensitive drums 13 of the four image formation units 12, a transfer unit 21 is provided. The transfer unit 21 includes transfer rollers 17C, 17M, 17Y, and 17K (which may be simply referred to as a transfer roller(s) 17 when there is no particular need to distinguish between them), and a transfer belt 20 that is provided so as to travel toward the direction indicated by the arrow A in FIG. 1 in a state of being stretched by a transfer belt drive roller 18 and a transfer belt driven roller 19.

The transfer rollers 17 are provided in pressure contact against the corresponding photosensitive drums 13 via the transfer belt 20. In nip portions formed by pressure contacts between the transfer rollers 17 and the respective photosensitive drums 13, the recording paper 22 conveyed by the transfer belt 20 is charged to the opposite polarity to the polarity of the toner, so that toner images of the respective colors (C, M, Y, K) formed on the photosensitive drums 13 are transferred sequentially onto the recording paper 22 in a superimposed manner.

A paper feed mechanism (or a medium feed mechanism) configured to feed the recording paper 22 to the transfer belt 20 is provided below the transfer unit 21 of the image formation apparatus 11. The paper feed mechanism includes: a support plate 35 on which sheets of the recording paper 22 are placed; a hopping roller 24 configured to take out one of the recording paper 22 and feed the taken-out recording paper 22 to a paper conveyance path 45; a spring 36 that presses the support plate 35 to press the top of the recording paper 22 placed on the support plate 35 against the hopping roller 24; a first transport roller pair 25 and a second transport roller pair 26 configured to convey the taken-out recording paper 22 along the paper conveyance path 45 to the transfer belt 20; and the like.

A fixation device 22 is provided on the discharge side of the transfer belt 20 in the conveyance direction of the recording paper 40. The fixation device 40 includes a fixation belt unit 41 and a pressure roller 42, and is configured to fix the toner transferred onto the recording paper 22 to the recording paper 22 by applying heat and pressure. On the discharge side of the fixation device 40, discharge roller pairs 27 and 28 are arranged along the paper conveyance path 45. The discharge roller pairs 27 and 28 are configured to discharge, along the paper conveyance path 45 to a paper stacker 46, the printed recording paper 22 that is discharged from the fixation device 40. Details of the fixation device 40 will be described later.

The photosensitive drum 13, the hopping roller 24, the first transport roller pair 25, the second transport roller pair 26, the transfer belt drive roller 18, and the discharge roller pairs 27 and 28 are rotated by a driver including a motor or the like.

Note that, with regard to the X, Y, and Z directions in FIG. 1, the X direction is the conveyance direction (the direction of the arrow A) in which recording paper 22 passes through the image formation units 12C, 12M, 12Y, and 12K, the Y direction is the direction parallel to the rotation axis of each photosensitive drum 13, and the Z direction is the direction perpendicular to both of the X and Y directions. The X, Y, and Z directions are also illustrated in the other figures described below, indicating the same directions as in FIG. 1. In other words, the X, Y, and Z directions in each figure indicate the directions of arrangement of the image formation apparatus 11 illustrated in FIG. 1. Note that the Z direction is oriented in a substantially vertical direction.

Figure 2:
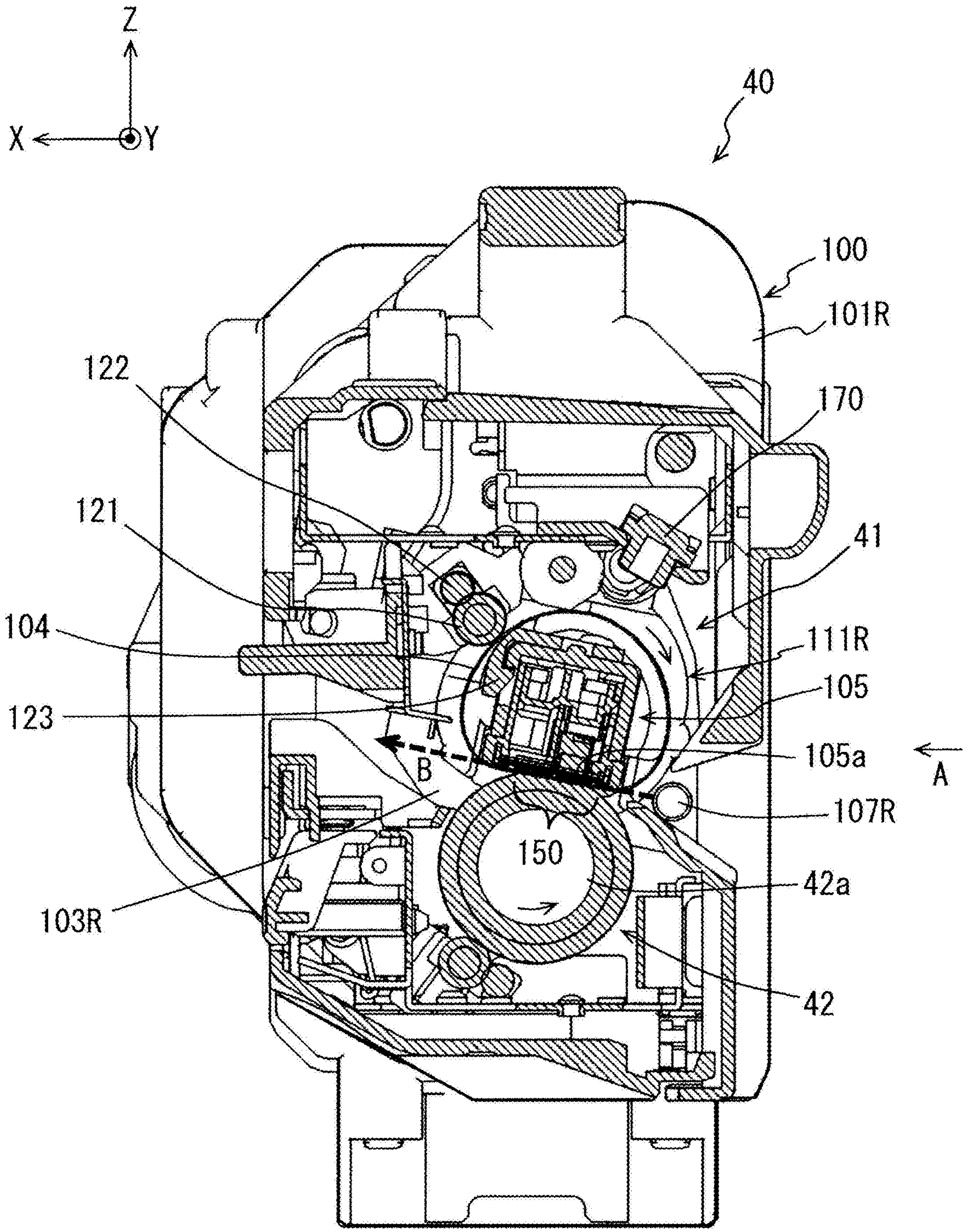
FIG. 2 is a diagram illustrating a view of a part of a configuration of a fixation device according to a first embodiment.
Figure 3:
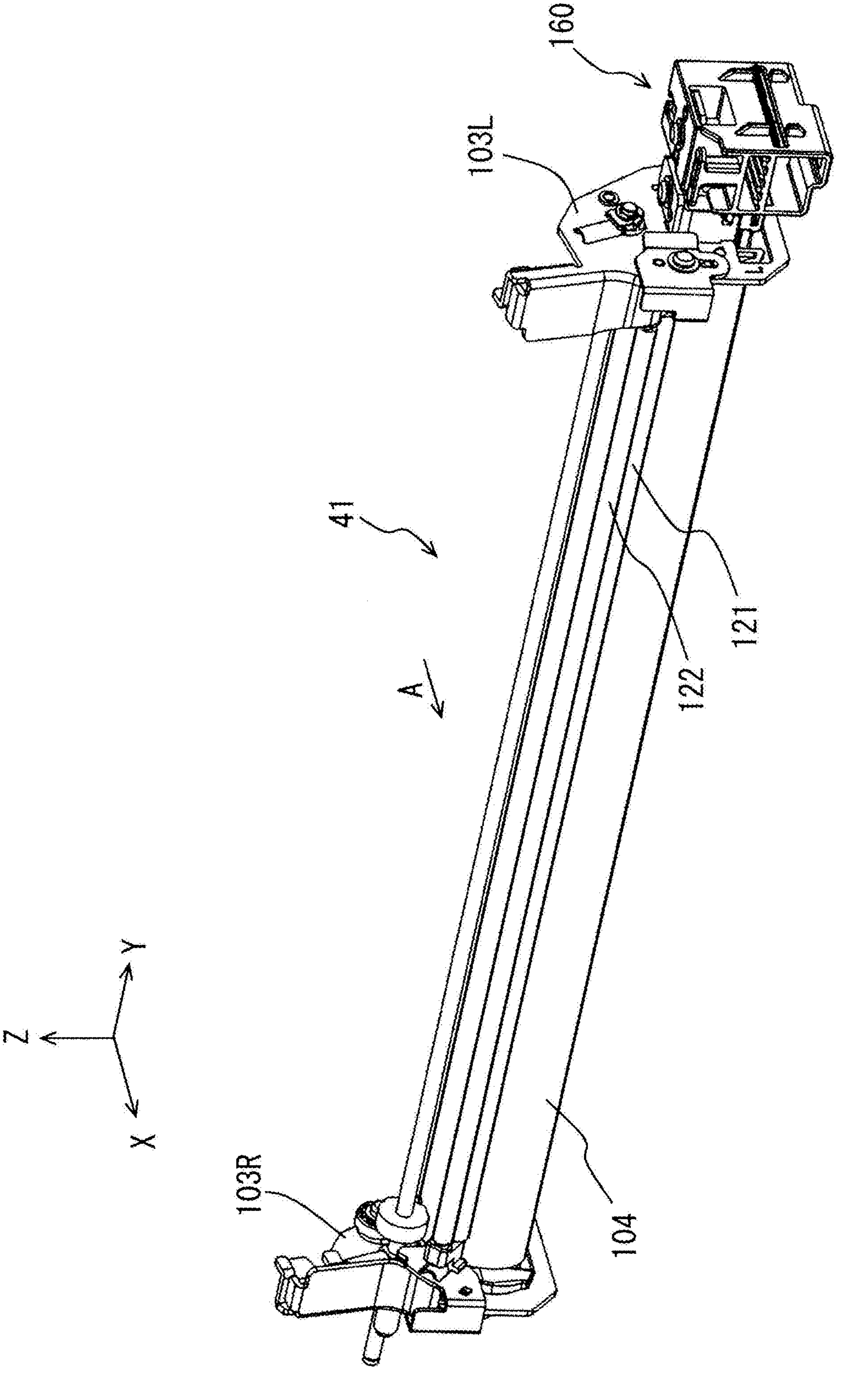
FIG. 3 is a diagram illustrating an external perspective view of a fixation belt unit as viewed obliquely from above.

FIG. 2 is a diagram illustrating a view of a configuration of a part of the fixation device 40 according to a first embodiment. FIG. 3 is a diagram illustrating an external perspective view of the fixation belt unit 41 as viewed obliquely from above. Note that the directions may be specified as upper (the positive direction of the Z axis), lower, left, right, front, and rear as viewed from the direction of the arrow A (FIG. 1), which is the conveyance direction of the recording paper 22 by the transfer belt 20.

As illustrated in these figures, the fixation device 40 is arranged so that both the pressure roller 42 as a rotation member and the fixation belt unit 41 extend in the Y direction. The fixation belt unit 41 is located above the pressure roller 42 and equipped with a fixation belt 104 as an endless annular belt. In the fixation belt unit 41, a heater unit 105 is disposed inside the fixation belt 104 extending in the Y direction, the heater unit 105 extending in the same direction and configured to heat the fixation belt 104 from the inside of the fixation belt 104. The Y direction in which the fixation belt unit 41 extends may be referred to as a longitudinal direction, or a width direction of the recording paper 22.

The pressure roller 42 is rotatably supported at both end portions of the rotation shaft 42*a* of the pressure roller 42 by a right side plate 101R and a left side plate (not illustrated) of the frame body 100 of the fixation device 40, which are arranged symmetrically to each other. The pressure roller 42 is rotated in the arrow direction (the counterclockwise direction) in the figure by receiving a rotational driving force from an external source. Note that the frame 100 includes the right side plate 101R and the left side plate (not illustrated) which are integrally provided to the frame 100, and holds components of the fixation device 40, such as the pressure roller 42 and the fixation belt unit 41, at predetermined positions.

The heater unit 105 includes a flat portion 105*a* at a lower part of thereof that transfers heat to the fixation belt 104, and is arranged in pressure contact with an elastic peripheral portion of the pressure roller 42 via the fixation belt 104 to form a nip portion 150. In this state, when the pressure roller 42 rotates in the arrow direction illustrated in FIG. 2, the fixation belt 104 also rotates together with the pressure roller 42.

At this time, the fixation belt 104 is guided, at both of the left and right end portions thereof, by left and right belt guides (flange members) as described in detail later, and is rotated in the clockwise direction by the rotation of the pressure roller 42. Note that the movement (rotation) of the fixation belt 104 may be referred to as rotational movement.

As described above, after the transfer of the toner images is completed on the recording paper 22, the recording paper 22 passes through the nip portion 150 in the direction of the dotted arrow B illustrated in FIG. 2. In the course of passing the recording paper 22 through the nip portion 150, the transferred toner images are fixed to the recording paper 22 by the heat and pressure that the recording paper 22 receives. Then, the recording paper 22 having the toner images fixed thereon is discharged from the fixation device 40.

Next, a configuration of the fixation belt unit 41, which rotatably supports the fixation belt 104 and includes the heater unit 105 arranged inside the fixation belt 104, is further described.

Figure 4:
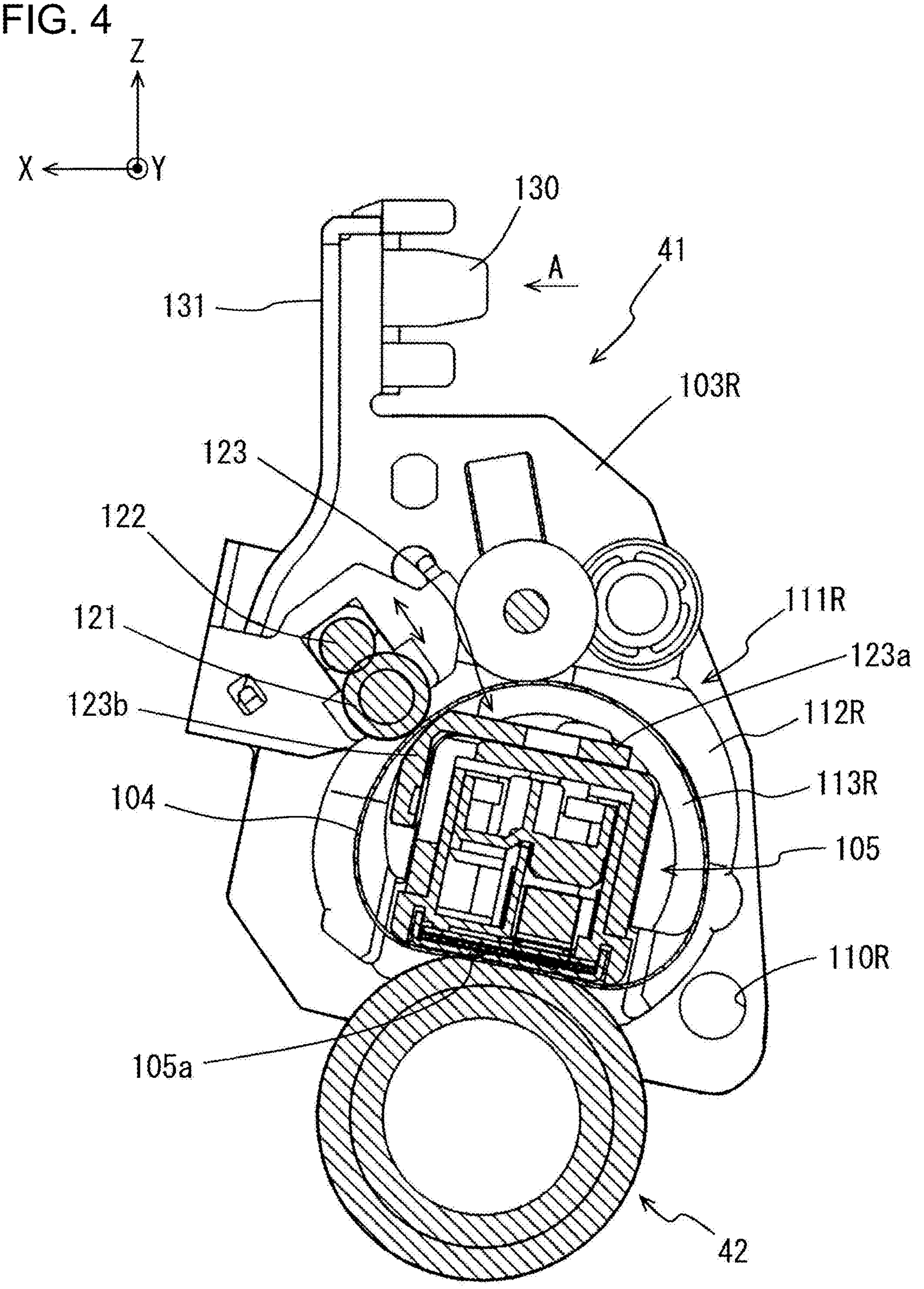
FIG. 4 is a diagram illustrating a cross sectional view of a part of the fixation belt unit illustrated in FIG. 3, taken along a center line in a longitudinal direction (a direction of the arrow Y) and viewed from the left side.

FIG. 4 is a cross sectional view of the fixation belt unit 41 illustrated in FIG. 3, taken at the center in the longitudinal direction (the arrow Y direction) of the fixation belt unit 41 and viewed from the left side. Note that FIG. 4 also illustrates the cross section of the pressure roller 42 taken at the same position.

As illustrated in FIG. 4, the fixation belt unit 41 includes a right pivot shaft hole 110R formed at a lower end portion of a right support lever 103R, into which a right pivot fulcrum 107R (FIG. 2) of the right side plate 101R is fitted. With this configuration, the fixation belt unit 41 is rotatably supported by the right side plate 101R.

The right support lever 103R is provided with a right guide member 111R that supports the right end portion of the fixation belt 104 to be rotatable, as described below. Further, the right support lever 103R supports fixedly the right end portion of the heater unit 105 arranged inside the fixation belt 104. Therefore, the right support lever 103R, the right guide member 111R, and the right end portion of the heater unit 105 are integrally configured.

Figure 5A:
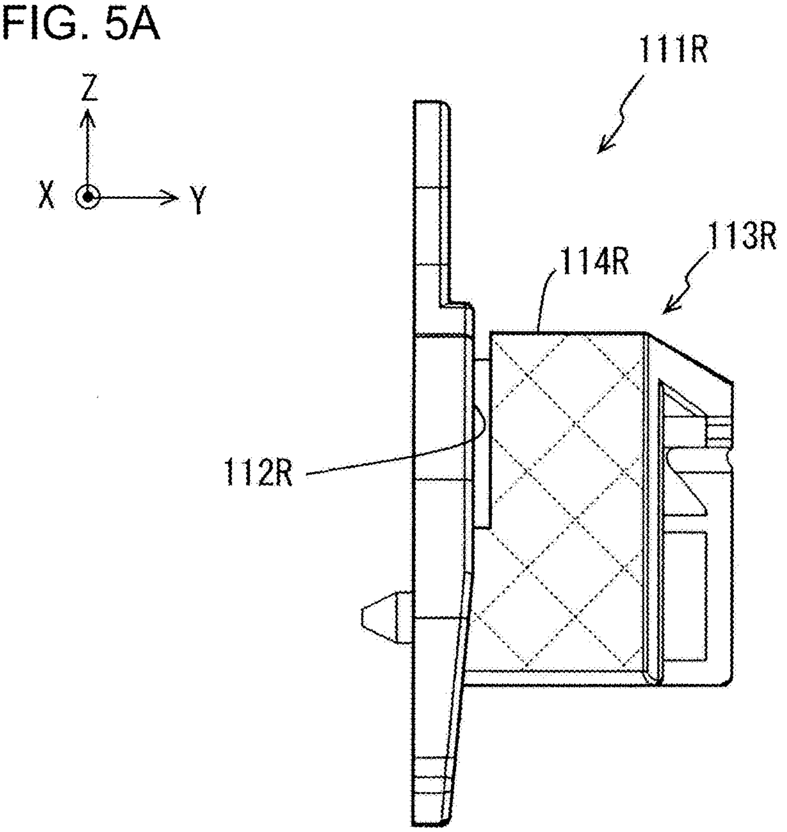
Figure 5B:
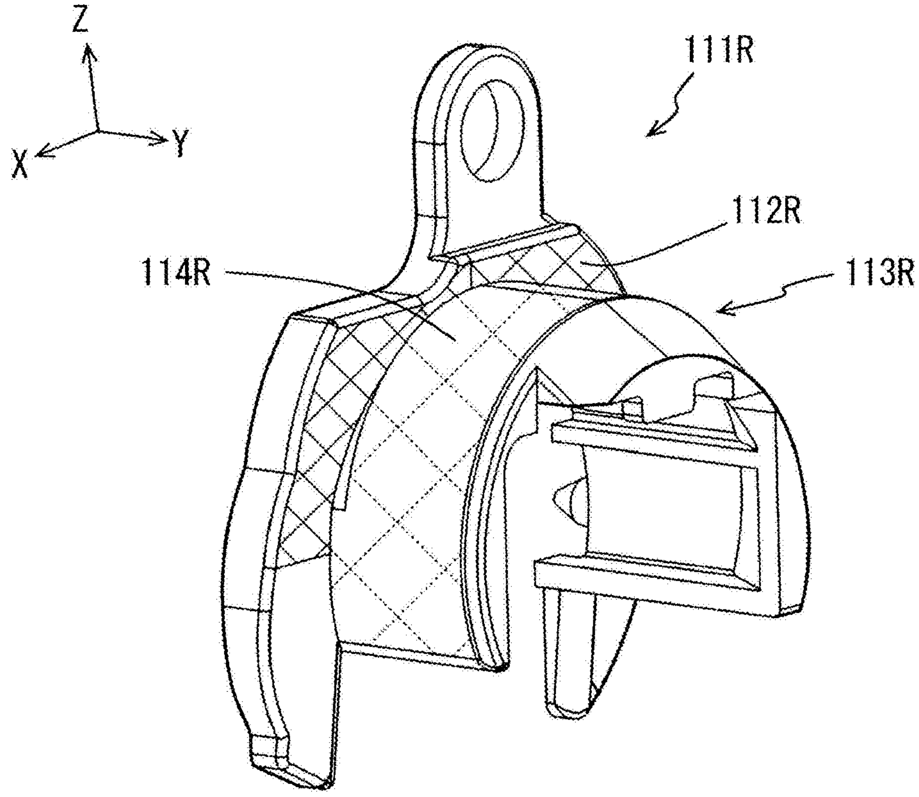

FIGS. 5A and 5B are diagrams illustrating the configuration of the right guide member 111R alone, in which FIG. 5A is a rear view of the right guide member and FIG. 5B is an external perspective view of the right guide member as seen from diagonally above.

As illustrated in these figures, the right guide member 111R serving as a flange member includes: an inner guide portion 113R that is located inside the right end portion of the fixation belt 104 as illustrated in FIG. 4, includes an outer circumferential surface formed in a roughly arc-shape in the cross section, and guides the inner circumferential surface of the fixation belt 104; and a right regulation portion 112R serving as a flange portion that comes in contact with the right end portion of the fixation belt 104 to regulate the movement of the fixation belt 104 in the right direction (the −Y direction).

Figure 6:
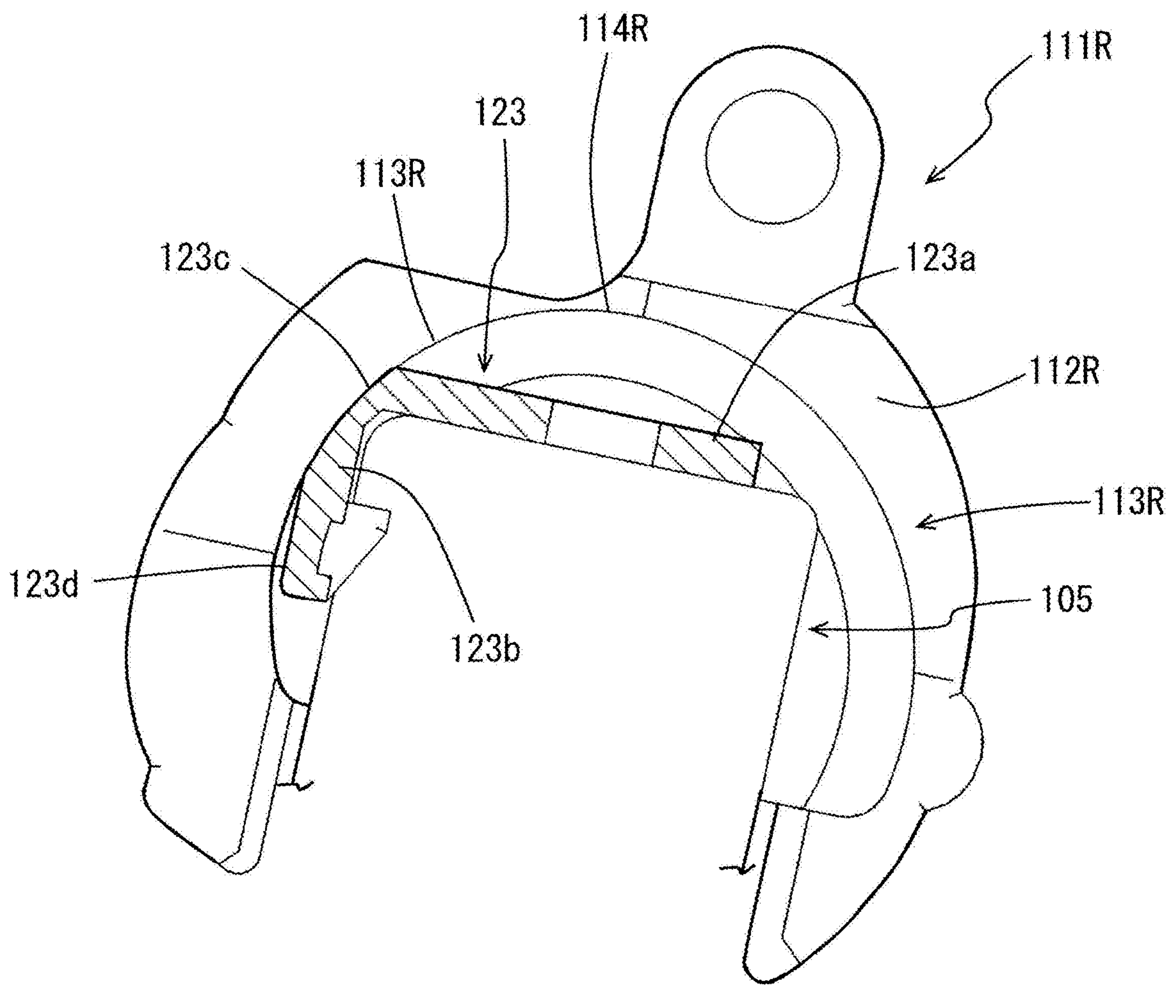
FIG. 6 is a diagram for explaining a configuration of an opposing member illustrated in FIG. 4 and a positional relationship between the right guide member and a heater unit.
Figure 7:
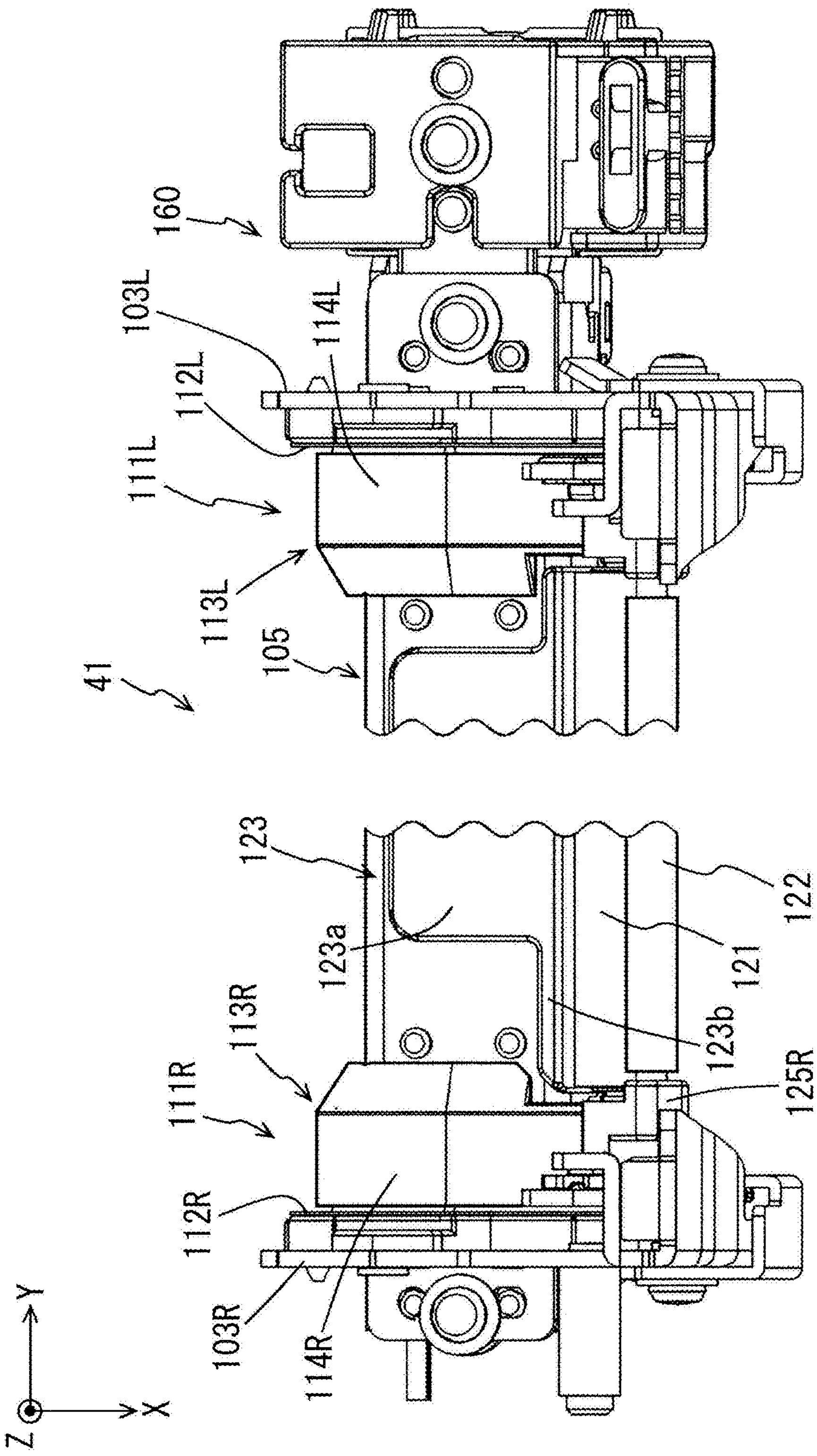
FIG. 7 is a diagram illustrating both end portions of the fixation belt unit viewed from approximately above, with a fixation belt and a central portion of the fixation belt unit being omitted.
Figure 8:
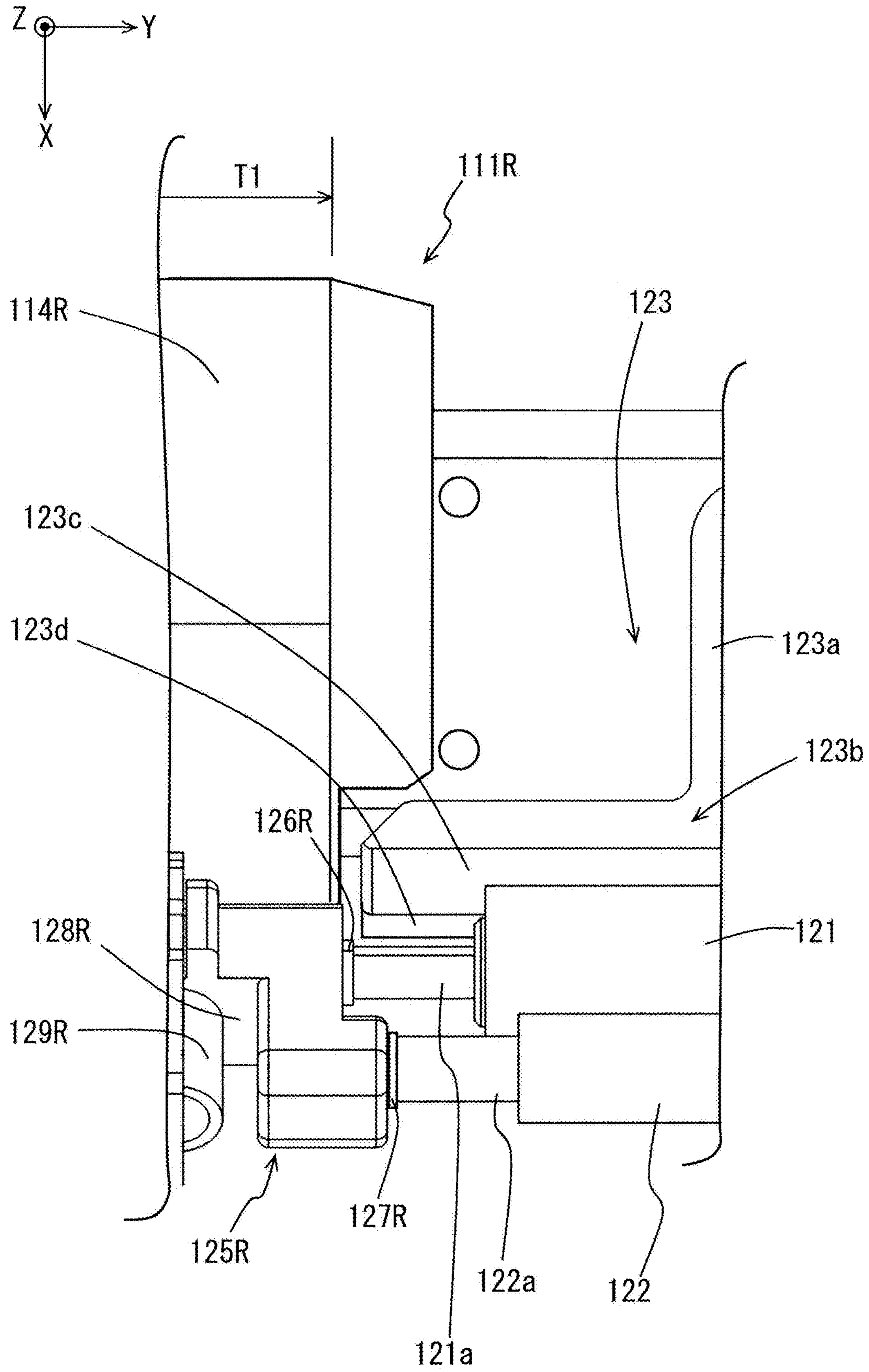
FIG. 8 is a diagram illustrating a partial enlarged view of a periphery of the right guide member illustrated in FIG. 7.

FIG. 6 is a diagram illustrating a view for explaining a configuration of the opposing member 123 illustrated in FIG. 4 and a positional relationship of the opposing member 123 with the right guide member 111R and heater unit 105. FIG. 7 is a diagram illustrating a view of configurations of both end portions of the fixation belt unit 41 as viewed approximately from above. For this reason, the fixation belt 104 and a central portion of the fixation belt unit are omitted in FIG. 7. FIG. 8 is a diagram illustrating a partially enlarged view of the periphery of the right guide member 111R illustrated in FIG. 7, but in FIG. 8, the relative positions of the cleaning roller 121, the opposing member 123, and the right end portion of the right guide member 111R are somewhat exaggerated in order to make it easier to understand the relative positional relationships.

As illustrated in FIGS. 4 to 8, the opposing member 123 includes an attachment portion 123*a* that is attached to an outer casing of the heater unit 105 extending in the longitudinal direction in the fixation belt 104 and is opposed to the upper surface of the outer casing of the heater unit 105 (see FIG. 4); and a guide portion 123*b* that extends along and is opposed to a portion of the outer casing of the heater unit 105 from the upper surface to the rear surface of the outer casing of the heater unit 105 (see FIG. 4). The guide portion 123*b* has a width that covers the area through which the recording paper 22 passes.

As illustrated in FIG. 6, when viewed along the longitudinal direction (the Y direction), the surface of the guide portion 123*b* includes: a belt sliding surface 123*c* and a belt introduction surface 123*d*. The belt sliding surface 123*c* serves as a contact surface against which the fixation belt 104 slides. The belt sliding surface 123*c* approximately flushes with the guide surface 114R, which serves as a support surface having an approximately arc-shaped cross section, of the inner guide portion 113R of the right guide member 111R. The belt introduction surface 123*d* is formed continuously with the belt sliding surface 123*c* and serves as an inclined surface that is deviated inwardly away from the fixation belt 104.

As illustrated in FIGS. 2, 3, 4, and the like, the fixation belt unit 41 further includes the cleaning roller 121 and a refreshing roller 122.

As illustrated in FIG. 8, a right end portion of a rotation shaft 121*a* of the cleaning roller 121 is rotatably held by a right bearing 126R, which is held by a right bearing holding member 125R, and a right end portion of a rotation shaft 122*a* of the refreshing roller 122 is rotatably held by a right bearing 127R, which is also held by the right bearing holding member 125R.

Further, configurations at the left end portion of the fixation belt unit 41 are configured in the same or similar manner as the right side plate 101R, the right support lever 103R, the right guide member 111R, the right bearing holding member 125R, and the right end portions of the heater unit 105 and the opposing member 123. In other words, except for an electrical connector connection portion (interface) 160 (FIG. 3), these are formed substantially symmetrically with respect to an imaginary center plane that intersects perpendicularly at the center of the longitudinal direction (Y direction) of the fixation belt unit 41. That is, as illustrated in FIG. 7, the configurations at the left side of the fixation belt unit 41 (e.g., a left support lever 103L, and a right regulation portion 112L, an inner guide portion 113L, and a guide surface 114L of a left guide member 111L) are provided substantially symmetrically with respect to the configurations of the right side of the fixation belt 41 (e.g., the right support lever 103R, and the right regulation portion 112R, the inner guide portion 113R, and guide surface 114R of the right guide member 111R).

In addition, the reference signs of components at the left and right end portions that are arranged symmetrically with respect to each other may be suffixed with "L" or "R" to distinguish between the left and the right, for example, the left support lever 103L and the right support lever 103R. Note that when there is no particular need to distinguish between the left and the right, these suffixes may be omitted and the components may be referred without the suffixes, for example, the support lever 103. In addition, for the components at the left and right end portions of the fixation belt unit 41 that are arranged in plane symmetry, only the configurations at the right end portion may be mainly described in the disclosure, and descriptions of the configurations at the left end portion may be omitted for avoiding redundancies.

The right bearing holding member 125R (FIG. 8) is configured in which the distance between the pair of right bearings is set so that the cleaning roller 121 and the refreshing roller 122 come into contact with each other with a predetermined nip portion formed therebetween as illustrated in FIG. 4. The right bearing holding member 125R is held by the right support lever 103R so that the cleaning roller 121 is slidable relative to the opposing member 123 in the arrow direction illustrated in FIG. 4.

As illustrated in FIG. 8, the right bearing holding member 125R is configured such that the cleaning roller 121 is pressed against the belt sliding surface 123*c* (FIG. 6) of the opposing member 123 via the fixation belt 104 by a right compression spring 129R suspended between the right support lever 103R and a bias reception surface 128R of the right bearing holding member 125R.

The fixation belt unit 41 configured as described above is supported to be rotatable by the pivot points 107 formed at the frame body 100 as described above, and is biased in the direction of the arrow A by a compression spring (not illustrated) suspended between the side plate 101 and a spring reception portion 130.

This biasing causes the flat portion 105*a* of the heater unit 105 to come into pressure contact with the pressure roller 42 via the fixation belt 104, so as to form the nip portion 150 (FIG. 2). Note that when the fixation belt 104 is to be separated from the pressure roller 42, the contact flat surface portion 131 (FIG. 4) is pressed by a cam or the like (not illustrated) to rotate the fixation belt unit 41 in the clockwise direction to separate the fixation belt 104 from the pressure roller 42.

As illustrated in FIG. 2, in the state where the nip portion 150 is formed, the pressure roller 42 rotates in the arrow direction (the counterclockwise direction), so that the fixation belt 104 rotates together with the pressure roller 42. In this state, when the recording paper 22 having the transferred images thereon passes through the nip portion 150 in the direction of arrow B, the transferred toner images are fixed to the recording paper 22 by the heating (by the fixation belt 104 heated to a predetermined temperature) and pressure during the passage. Then, the recording paper 22 is discharged from the fixation device 40.

As illustrated in FIG. 2, on the downstream side of the nip portion 150 in the rotational movement direction of the fixation belt 104, the cleaning roller 121 is provided in pressure contact with the belt sliding surface 123*c* (FIG. 6) of the opposing member 123 via the fixation belt 104. The cleaning roller 121 is thus rotated in the counterclockwise direction by the rotational movement of the fixation belt 104. The refreshing roller 122, which is in pressure contact with the cleaning roller 121, is thus rotated in the clockwise direction by the rotation of the cleaning roller 121.

By these rotations, the cleaning roller 121 removes the developer adhered to the fixation belt 104 during the fixation process, and the refreshing roller 122 removes the developer adhered to the cleaning roller 121. Accordingly, the fixation belt 104 heated at the nip portion 150 comes into direct contact with the cleaning roller 121 while still at a high temperature, so that the removal process can be carried out efficiently. Therefore, the opposing member 123 is formed in an area including the position where the outer circumferential surface of the fixation belt 104 that has passed through the nip portion 150 first comes into contact with the cleaning roller 121.

To the contrary, as illustrated in FIG. 2, a temperature detector 170 is provided on the upstream side of the nip portion 150 in the rotational movement direction of the fixation belt 104. The temperature detector 170 is provided in a vicinity of the rotational movement path of the fixation belt 104, and detects the temperature of the fixation belt 104 which continuously passes as the fixation belt 104 rotates.

A fixing temperature controller (not illustrated), which may include one or more processors configured with a program, controls the heat generation temperature of the heater unit 105 so that the detected temperature is maintained at a desired temperature. Therefore, since a portion of the fixation belt 104 that has passed through the temperature detector 170 next reaches the nip portion 150, the temperature detected by the temperature detector 170 is close to the temperature of the fixation belt 104 at the nip portion 150, thereby realizing high-precision temperature control at the nip portion 150 despite the presence of the cleaning roller 121.

Figure 9A:
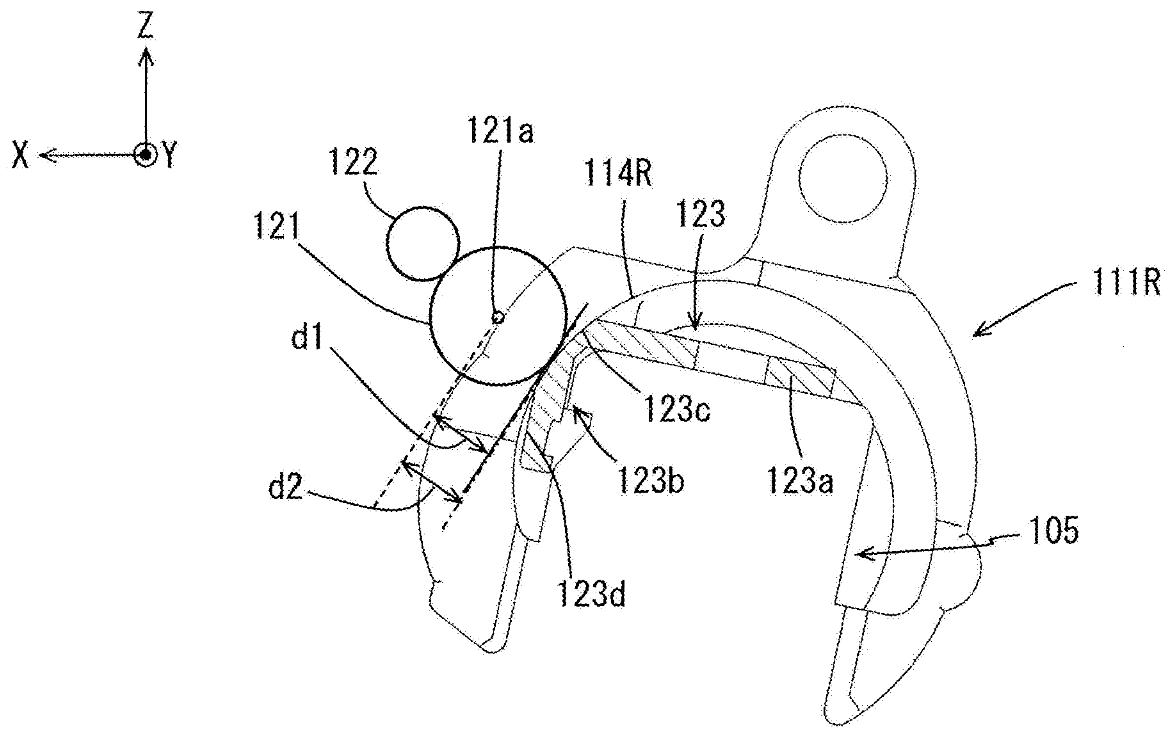
Figure 9B:
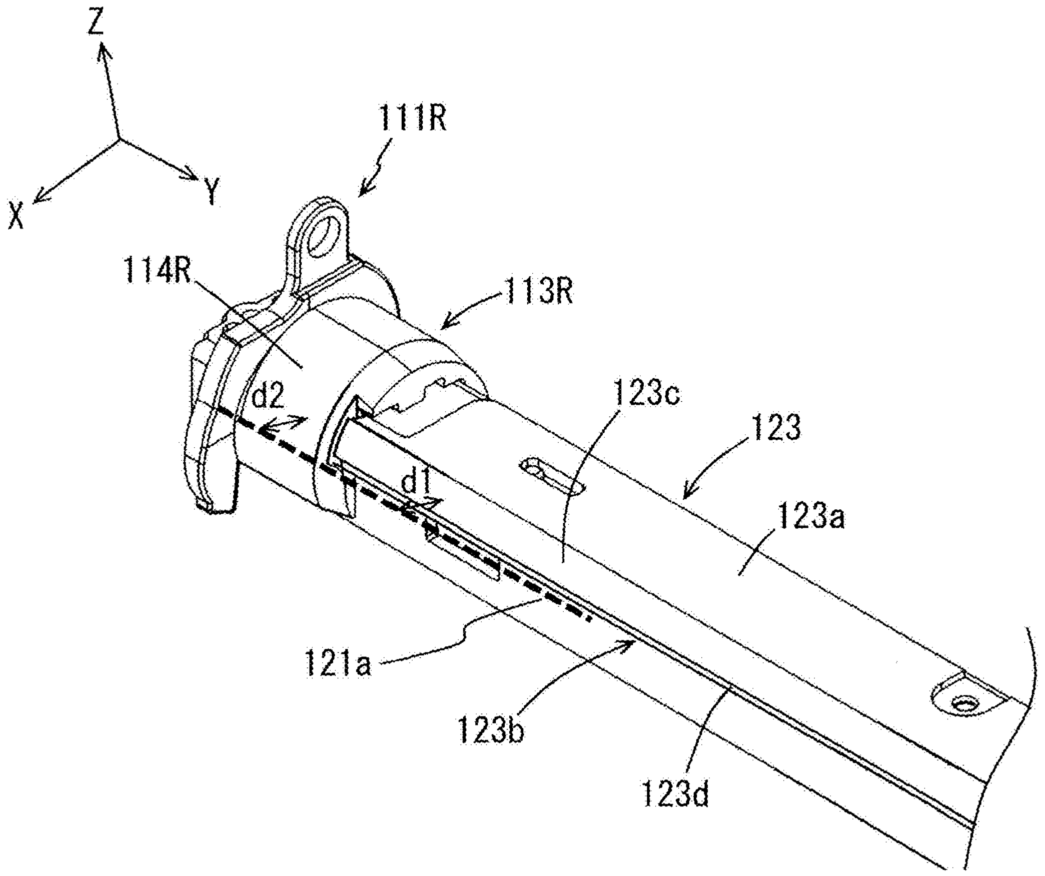

FIGS. 9A and 9B are diagrams for explaining a positional relationship between the opposing member 123, the right guide member 111R, and the cleaning roller 121. FIG. 9A illustrates a schematic view of a part of the fixation belt unit as seen from the left side of the longitudinal direction of the fixation belt unit 41 (the positive side of the direction of the arrow Y), and FIG. 9B illustrates a perspective view of a part of the fixation belt unit as viewed from diagonally above.

As illustrated in these figures, in the state where the opposing member 123, the right guide member 111R, and the cleaning roller 121 are arranged in the predetermined positions, the cross sectional shape of the belt sliding surface 123*c* of the opposing member 123 is aligned with the guide surface 114R, which has the approximately arc shape in the cross section, of the inner guide portion 113R of the right guide member 111R. That is, the inner guide portion 113R does not have any uneven surface or discontinuous curved surface.

Further, when the shortest distance from a rotation axis or an axial center of the cleaning roller 121 (the center of the rotation shaft 121*a*) to the guide surface 114R of the inner guide portion 113R of the right guide member 111R is referred to as a second distance d2, and similarly the shortest distance from the rotation axis or the axial center of the cleaning roller 121 (the center of the rotation shaft 121*a*) to the belt sliding surface 123*c* of the opposing member 123 is referred to as a first distance d1, the following equation is satisfied: $1\ [\mathrm{mm}] \geq (d1-d2) \geq 0$. That is, the second distance d2 is equal to or slightly smaller than the first distance d1.

That is, at the contact portion with the cleaning roller 121, the guide surface 114R of the inner guide portion 113R of the right guide member 111R is formed to be flush with the belt sliding surface 123*c* of the opposing member 123 or to protrude slightly toward the cleaning roller 121. By configurating the fixation belt 104 in this manner, deformation or damage to the fixation belt 104 due to uneven surfaces can be prevented, and the end portions of the fixation belt 104 can be prevented from curving inward.

As illustrated in FIG. 8, in the longitudinal direction (the arrow Y direction) of the fixation belt unit 41, the width of the belt sliding surface 123*c* of the opposing member 123 is wider than the width of the cleaning roller 121, and the cleaning roller 121 is configured to be provided within the area of the belt sliding surface 123*c* of the opposing member 123, and the passing area of the conveyed recording paper 22 is configured to be provided within the area of the cleaning roller 121. Further, the cleaning roller 121 is configured such that the end portion of the cleaning roller 121 does not reach the region T1 of the guide surface 114R.

As described above, according to the fixation device according to a first embodiment, the guide surface 114 of the support lever 103, which is in pressure contact against the cleaning roller 121 via the fixation belt 104, and the belt sliding surface 123*c* of the opposing member 123 form curved surfaces approximately flush with each other. This prevents damage, deformation such as bending, and the like caused by localized load on the fixation belt 104 resulting from variations between the two surfaces, improves the durability of the fixation belt 104, and further prevents the end portions of the fixation belt 104 from bending inward.

Further, in the direction of the rotational movement of the fixation belt 104, the cleaning roller 121 is arranged downstream of the nip portion 150, and thus, a portion of the fixation belt 104 that has passed through the temperature detector 170, which is provided on the upstream side of the nip portion 150, reaches directly the nip portion 150 before reaching to the cleaning roller 121, thereby making it possible to improve the accuracy of the temperature detection of the fixation belt 104 during the fixation.

Second Embodiment

Figure 10A:
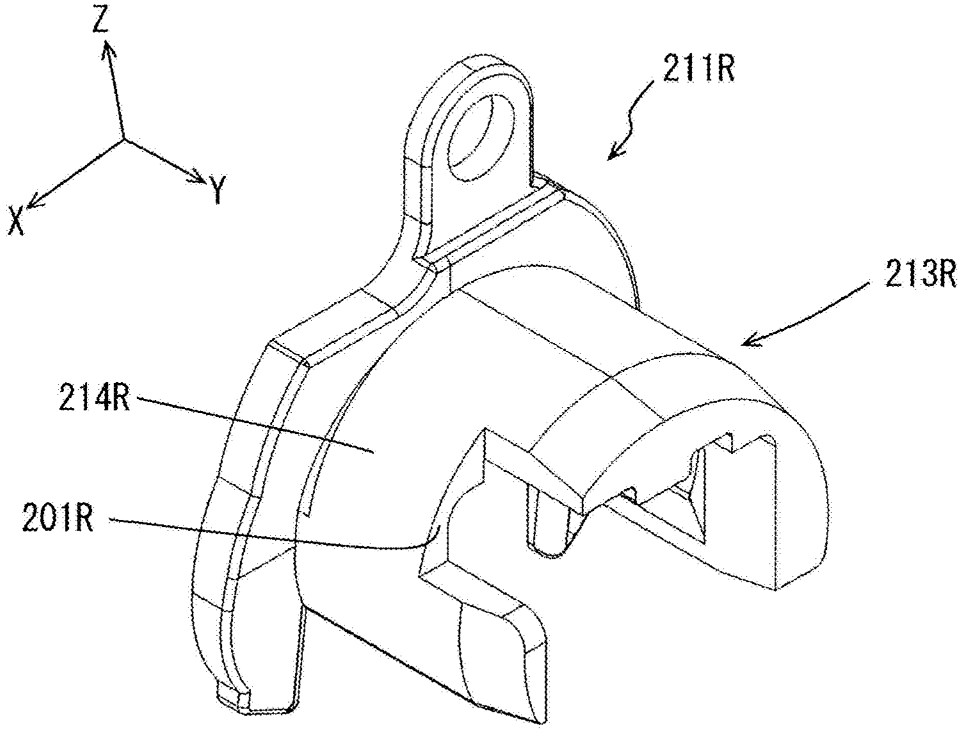
Figure 10B:
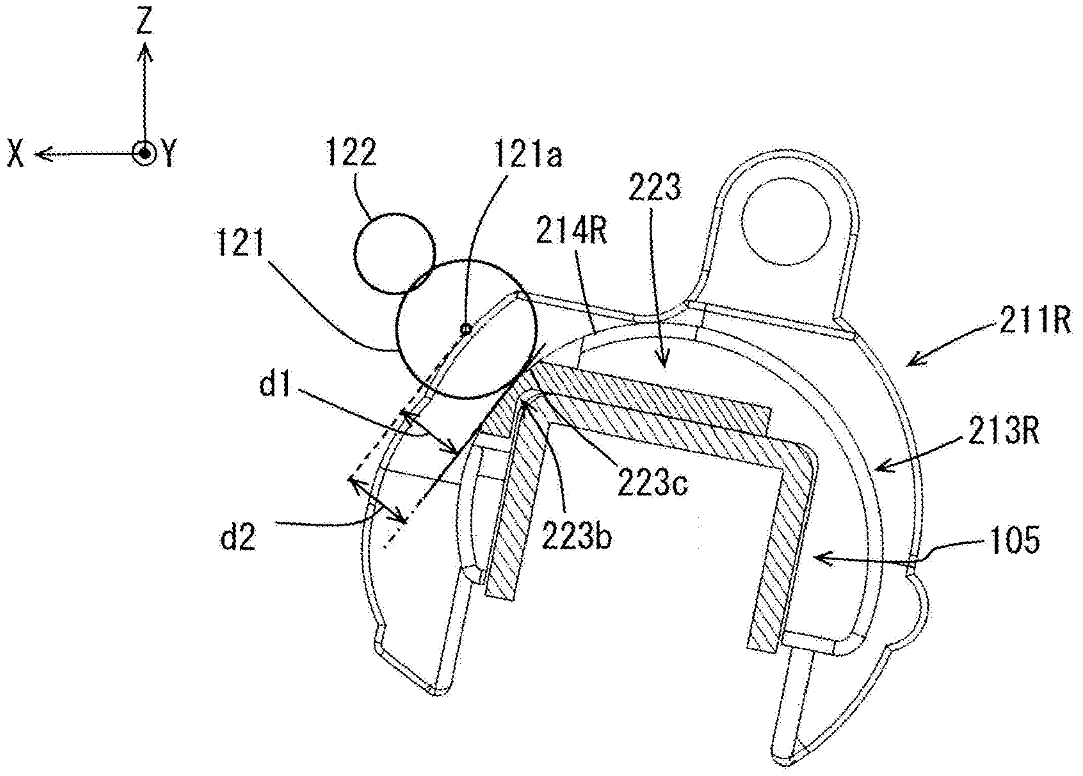
Figure 11:
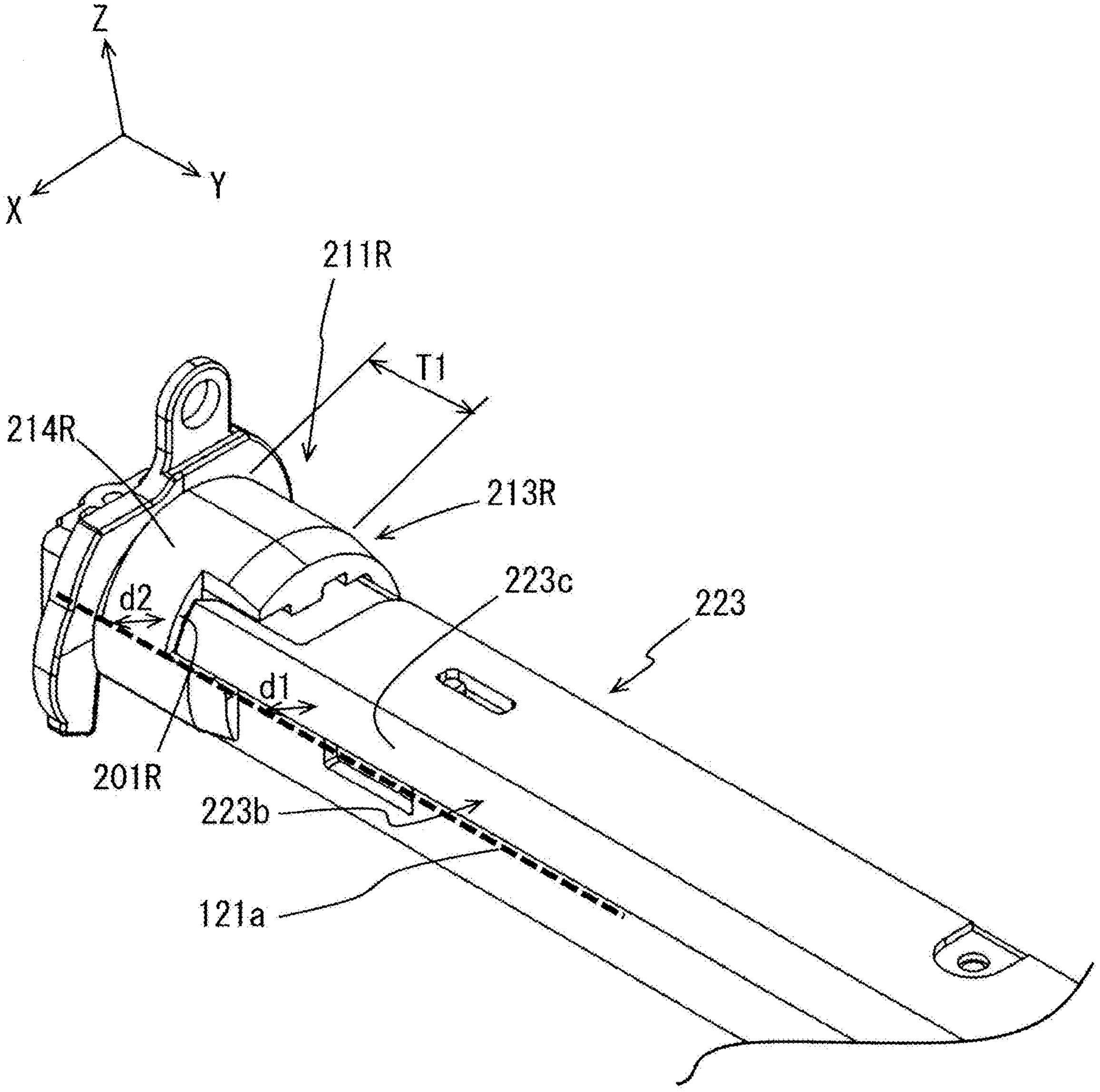
FIG. 11 is a diagram illustrating a perspective view of the components illustrated in FIG. 10B as viewed obliquely from above.

FIGS. 10A and 10B are diagrams for explaining a configuration of a right guide member 211R to be used in a fixation device according to a second embodiment. FIG. 10A illustrates an external perspective view of the right guide member 211R, and FIG. 10B illustrates a schematic view of a part of the fixation device as viewed from the positive side of the arrow Y direction, with the right guide member 211R, the heater unit 105, the cleaning roller 121, and an opposing member 223 arranged in predetermined positions. FIG. 11 is a diagram illustrating a perspective view of the components illustrated in FIG. 10B as viewed obliquely from above.

The right guide member 211R and the opposing member 223 according to a second embodiment such as being illustrated in FIG. 11 differ from the right guide member 111R and the opposing member 123 according to a first embodiment such as being illustrated in FIG. 9B in that, in a second embodiment, an inner guide portion 213R of the right guide member 211R is formed with a cutout portion 201R (or a recess portion) that reaches a guide surface 214R of the inner guide portion 213R, and a right end portion of a guide portion 223*b* of the opposing member 223 is inserted in the cutout portion 201R.

Therefore, the parts of the fixation device according to a second embodiment, employing the right guide member 211R and the opposing member 223, that are common to the parts of the fixation device 40 (FIG. 2) of a first embodiment described above will be given the same reference numerals or will not be illustrated in the drawings to omit redundancies, and the differences will be mainly described. Note that, a main configuration of the image formation apparatus according to a second embodiment is common to a main configuration of the image formation apparatus 11 according to a first embodiment illustrated in FIG. 1 except for the fixation device, so FIG. 1 will be referred to as necessary.

As illustrated in FIG. 11, in a second embodiment, the right end portion of the guide portion 223*b* of the opposing member 223 reaches the region T1 of the guide surface 214R in the longitudinal direction of the fixation belt unit 41 (the direction of the arrow Y). Therefore, the guide surface 214R and a belt sliding surface 223*c* of the opposing member 223 form continuous curved surfaces, except for a small gap, in both the longitudinal direction and the circumferential direction, in the vicinity of the contact portion with the cleaning roller 121.

As illustrated in FIGS. 10B and 11, in the state where the opposing member 223, the right guide member 211R, and the cleaning roller 121 are arranged in the respective predetermined positions, the cross-sectional shape of the belt sliding surface 223*c* of the opposing member 223 is aligned with the guide surface 214R, which has an approximately arc-shaped cross section, of the inner guide portion 213R of the right guide member 211R.

Further, when the shortest distance from the rotation axis or the axial center of the cleaning roller 121 (the center of the rotation shaft 121*a*) to the guide surface 214R of the inner guide portion 213R of the right guide member 211R is referred to as a second distance d2, and the shortest distance from the rotation axis or the axial center of the cleaning roller 121 (the center of the rotation shaft 121*a*) to the belt sliding surface 223*c* of the opposing member 223 is referred to as a first distance d1, the following equation is satisfied as in the case of a first embodiment: $1\ \text{mm} \geq (d1-d2) \geq 0$. That is, the second distance d2 is equal to or slightly smaller than the first distance d1.

In other words, at the contact portion with the cleaning roller 121, the guide surface 214 R of the inner guide portion 213 R of the right guide member 211 R is formed to be flush with the belt sliding surface 223*c* of the opposing member 223 or to protrude slightly toward the cleaning roller 121. By configurating the fixation belt 104 in this manner, deformation or damage to the fixation belt 104 due to uneven surfaces can be prevented, and the end portions of the fixation belt 104 can be prevented from curving inward.

In addition, in the longitudinal direction (the direction of the arrow Y) of the fixation belt unit 41, the width of the belt sliding surface 223*c* of the opposing member 223 is wider than the width of the cleaning roller 121, and the cleaning roller 121 is configured to be provided within the area of the belt sliding surface 223*c* of the opposing member 223, and further the passing area of the conveyed recording paper 22 is configured to be provided within the area of the cleaning roller 121.

As described above, according to the fixation device of a second embodiment, the guide surface 214R of the opposing member 223 and the belt sliding surface 223*c* of the opposing member 223 form the continuous curved surfaces, except for the small gap, in both the longitudinal direction and the circumferential direction around the contact portion with the cleaning roller 121. Therefore, the fixation device of a second embodiment can enhance continuity of the two curved surfaces, in addition to obtaining the same effects as those of a first embodiment described above.

In the disclosure, the terms "upper," "lower," "left," "right," "front," "rear," and the like are used, but these are used for convenience for explanation and do not limit the absolute positional relationship in the state where the fixation device is arranged.

Aspects of the disclosure may be summarized below as appendices.

Appendix 1

A fixation device that may include: an annular belt; a pair of flange members facing both ends of the annular belt, respectively, each of the pair of flange members including: a flange portion that regulates an end portion of the annular belt; and a support surface that supports an inner circumferential surface of the annular belt; a cleaning roller in contact with an outer circumferential surface of the annular belt; and an opposing member provided between the pair of flange members and facing the cleaning roller with the annular belt therebetween in a region where the annular belt and the cleaning roller are in contact with each other. In a view along an axial direction of the cleaning roller, a first distance from an axial center of the cleaning roller to the opposing member is equal to or greater than a second distance from the axial center of the cleaning roller to the support surface.

Appendix 2

The fixation device according to Appendix 1, further comprising a rotation member configured to form a nip portion with the annular belt, wherein a region in which the opposing member is arranged in a circumferential direction of the annular belt is provided on a downstream side of the nip portion in a rotational movement direction of the annular belt and includes a position where the outer circumferential surface of the annular belt that has passed through the nip portion first comes into contact with another member.

Appendix 3

The fixation device according to Appendix 1 or 2, wherein the opposing member includes an inclined surface that is provided on an upstream side, in the rotational movement direction of the annular belt, of a contact surface of the opposing member that contacts the annular belt, and that is inclined such that the inclined surface is further separated away from the support surface as farther away from the contact surface in a view along the axial direction of the cleaning roller.

Appendix 4

The fixation device according to Appendix 2, further comprising a temperature detector configured to detect a temperature of the annular belt, wherein the temperature detector is configured to detect the temperature of the annular belt at a position, in a rotational movement direction of the annular belt, on an upstream side of the nip portion and between the nip portion and a position where the annular belt contacts the cleaning roller.

Appendix 5

The fixation device according to Appendix 1 or 2, wherein in the axial direction of the cleaning roller, a width of the cleaning roller is narrower than a width of the opposing member, and an end portion of the cleaning roller does not reach an area of the support surface.

Appendix 6

The fixation device according to Appendix 1 or 2, wherein the support surface is a curved surface having a substantially arcuate shape in a cross section thereof and does not include an uneven surface.

Appendix 7

The fixation device according to Appendix 1 or 2, wherein when the first distance is referred to as d1 and the second distance is referred to as d2, the following equation is satisfied: $1\ \text{mm} \geq (d1-d2) \geq 0$.

Appendix 8

An image formation apparatus comprising the fixation device according to Appendix 1 or 2.

In one or more embodiments described above, the case has been described in which the image formation apparatus is the color printer, but the invention is not limited thereto, and the invention can be employed in an image formation apparatus such as a copier, a facsimile machine, and a multifunction peripheral (MFP). Also, the invention may be employed to a monochrome printer.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A fixation device comprising:

an annular belt;

a pair of flange members facing both ends of the annular belt, respectively, each of the pair of flange members including: a flange portion that regulates an end portion of the annular belt; and a support surface that supports an inner circumferential surface of the annular belt;

a cleaning roller in contact with an outer circumferential surface of the annular belt; and an opposing member provided between the pair of flange members and facing the cleaning roller with the annular belt therebetween in a region where the annular belt and the cleaning roller are in contact with each other, wherein in a view along an axial direction of the cleaning roller, a first distance from an axial center of the cleaning roller to the opposing member is equal to or greater than a second distance from the axial center of the cleaning roller to the support surface.

2. The fixation device according to claim 1, further comprising:

a rotation member configured to form a nip portion with the annular belt, wherein a region in which the opposing member is arranged in a circumferential direction of the annular belt is provided on a downstream side of the nip portion in a rotational movement direction of the annular belt and includes a position where the outer circumferential surface of the annular belt that has passed through the nip portion first comes into contact with another member.

3. The fixation device according to claim 1, wherein the opposing member includes an inclined surface that is provided on an upstream side, in the rotational movement direction of the annular belt, of a contact surface of the opposing member that contacts the annular belt, and that is inclined such that the inclined surface is further separated away from the support surface, as farther away from the contact surface in a view along the axial direction of the cleaning roller.

4. The fixation device according to claim 1, further comprising:

a rotation member configured to form a nip portion with the annular belt; and a temperature detector configured to detect a temperature of the annular belt, wherein the temperature detector is configured to detect the temperature of the annular belt at a position, in a rotational movement direction of the annular belt, on an upstream side of the nip portion and between the nip portion and a position where the annular belt contacts the cleaning roller.

5. The fixation device according to claim 1, wherein in the axial direction of the cleaning roller, a width of the cleaning roller is narrower than a width of the opposing member, and an end portion of the cleaning roller does not reach an area of the support surface.

6. The fixation device according to claim 1, wherein the support surface is a curved surface having a substantially arcuate shape in a cross section thereof and does not include an uneven surface.

7. The fixation device according to claim 1, wherein when the first distance is referred to as $d1$ and the second distance is referred to as $d2$, the following equation is satisfied: $1\ \text{mm} \geq (d1-d2) \geq 0$.

8. An image formation apparatus comprising the fixation device according to claim 1.

* * * * *